United States Patent [19]
Maly et al.

[11] Patent Number: 6,156,143
[45] Date of Patent: Dec. 5, 2000

[54] RUBBER TIRE COMPONENTS WITH REDUCED SPIDER FLOW

[75] Inventors: Neil Arthur Maly, Tallmadge; Lewis Timothy Lukich, Akron; Paul Harry Sandstrom, Tallmadge, all of Ohio

[73] Assignee: The Goodyear Tire & Rubber Company, Akron, Ohio

[21] Appl. No.: 09/443,584

[22] Filed: Nov. 19, 1999

Related U.S. Application Data

[63] Continuation of application No. 08/769,840, Dec. 20, 1996, abandoned.

[51] Int. Cl.[7] ............................... B29D 30/06; B60C 1/00
[52] U.S. Cl. .......................... 156/123; 152/532; 152/537; 152/547; 152/564; 156/133
[58] Field of Search ...................................... 152/548, 564, 152/209.1, 525, 537, 547, 532; 156/123, 110.1, 133

[56] References Cited

FOREIGN PATENT DOCUMENTS

WO92/01744  2/1992  WIPO ..................................... 152/564

*Primary Examiner*—Geoffrey L. Knable
*Attorney, Agent, or Firm*—Henry C Young, Jr

[57] ABSTRACT

Disclosed is the use of a brominated polymer derived from isobutylene and p-methylstyrene monomers to decrease the spider flow of various rubber components used in the carcass of an uncured pneumatic tire. The amount of the brominated polymer utilized is in a range of about 3 to about 15 phr. The various components include the ply coat, wire coat, tread cushion, belt-edge gumstrip, apex, chipper, and barrier.

1 Claim, No Drawings

RUBBER TIRE COMPONENTS WITH REDUCED SPIDER FLOW

This is a continuation of application Ser. No. 08/769,840, filed on Dec. 20, 1996 now abandoned.

FIELD OF THE INVENTION

The present invention relates to the use of a brominated polymer from isobutylene and p-methylstyrene to reduce spider flow in a rubber component in a pneumatic tire.

BACKGROUND

Brominated polymers from isobutylene and p-methylstyrene are disclosed in U.S. Pat. No. 5,162,445. The brominated polymers are high in isobutylene content and sometimes can be substituted for butyl rubber (including halogenated butyl rubber) in many applications including tire innerliners and tire curing bladders.

Sometimes it is desirable to decrease spider flow without sacrificing other properties of an uncured rubber composition. Spider flow relates to the tendency of the rubber composition to flow under heat and pressure during curing. Quantification of the spider flow starting uncured and finishing cured helps predict deformation of the rubber component during molding and curing of the green tire.

The spider flow test is a measure of the tendency of a rubber composition to flow over a time period, through a specified diameter orifice in a transfer type mold preheated to a specified temperature thereby filling a complex pattern in the mold. The amount of extrudate which passes through the orifice is weighed. A constant force from a hydraulic ram is used to force the rubber through the orifice. The mold uses a 35 gram uncured rubber sample. It is to be understood that the viscosity of the rubber is changing during the test because the uncured rubber is crosslinking to a cured state during the test. The name spider flow is used because the mold produces a specimen having a central plug and a multitude of appendages therefrom known as the legs. Examples of the molded specimen output are shown in *The Vanderbilt Rubber Handbook* 13th Ed. published by the R. T. Vanderbilt Company Norwalk, CT (1990) page 434, 454 and 464.

SUMMARY OF THE INVENTION

It is an aspect of this invention to provide one or more rubber components, such as used in the assembly of green, or uncured, pneumatic tires, which component will desirably have reduced spider flow. The rubber component or components can be used in the carcass of a pneumatic tire. A method of preparing a pneumatic tire using a rubber component with decreased spider flow is also provided. The carcass of a tire supports a circumferential rubber tread, two rubber sidewalls, an optional innerliner (if a tubeless tire) and is connected to two spaced beads. The reduction in spider flow for this invention is due to the incorporation of from about 3 to about 15 parts by weight of a brominated polymer comprising from about 1 to about 14 weight percent repeat units derived from p-methylstyrene, from about 85 to about 98.9 weight percent repeat units derived from isobutylene and from about 0.1 to about 4 weight percent bromine. The decrease in spider flow will decrease undesirable deformation or flow of the rubber component having critical shape, size, or location requirements during the final shaping and curing of the tire.

In accordance with this invention, a pneumatic tire is provided which includes a circumferential rubber tread, a supporting carcass therefore, two spaced reinforcing beads and two rubber sidewalls contacting said beads and optionally an innerliner; wherein said carcass includes at least one rubber component, the improvement wherein said at least one rubber component of said carcass, comprises a) from about 85 to about 97 parts by weight of at least one rubber selected from natural rubber or at least one synthetic diene-based elastomer, or a combination thereof; b) from about 3 to about 15 parts by weight of a brominated polymer having from about 0.1 about 4 weight percent bromine and having repeat units derived from the polymerization of monomers including isobutylene in an amount from about 85 to 98.9, alternatively about 88 to about 97.9, weight percent and para-methylstyrene in an amount from about 1 to about 14, alternatively about 2 to about 11, weight percent, and wherein said parts by weight are based upon 100 parts by weight of total rubber in said at least one rubber component.

DETAILED DESCRIPTION

Pneumatic tires are generally assembled from numerous rubber and non-rubber components. Some of the non-rubber components (also sometimes referred to as reinforcing components) have higher modulus and are incorporated to impart strength to the tire. The ability of these higher modulus materials to impart strength is dependent on the ability of the tire manufacturer to permanently adhere these high modulus materials to the rest of the tire. The retention of rubber components and the high modulus materials at specific locations in the tire during assembly and curing of the tire is also critical. When the tire deforms in actual use, the rubber components holding the higher modulus materials in place need to be of sufficient dimensions and located appropriately to receive and withstand the stresses imparted thereto from the higher modulus non-rubber components. If the rubber components are deformed in shape or improperly located in the tire then tearing of the rubber or delaminating of the rubber from other components might occur. Deformed rubber components in the bead region of the tire might result in poor air seals with a tire rim or abrasion of the bead region by the rim.

For the purposes of this disclosure the tire carcass will be defined to exclude the exterior sidewalls, the tread cap, the optional innerliner(s) and the reinforcing beads. The tread cap is a specific rubber component designed to impart good traction and wear resistance namely, an outer portion of the tread designed to be ground-contacting. The rubber compounds thereof usually need a relatively high spider flow to conform and fill the tread patterns in the tire mold. The exterior sidewalls are a specific rubber component that is designed to have properties such as, for example, low modulus, scuff resistance and crack growth resistance. The innerliner(s) is often an isobutylene based polymer that acts as a barrier to the escape of pressurized gases (e.g. air) from inside the tire. The rubber components of the tire exclusive of the tread cap, sidewalls, and optional innerliner will also be used to define the rubber components which may benefit from spider flow reduction and which have not been known to be formulated with from 3 to 15 phr of brominated polymer derived from isobutylene and p-methylstyrene.

The rubber components that may benefit from decreased spider flow include the bead insulation, which together with the beads acts as a load transfer mechanism between the tire and the rim; the rubber of the various belt coats, which are rubber coatings on the belts and/or wires; the gum chafer, an intermediate rubber layer external to the sidewall plies in the bead region of the tire; the rubber used in the ply coats, which is a rubber coating on the various plies that extend from the inner bead to the tread and then to the outer bead of the tire; the rubber of the wedges, which include shoulder wedges to reduce interply shear strain and belt edge wedge; tread base which is a rubber component under the tread cap; tread cushion/belt edge overlay gumstrip which is not the tread cap itself; apex; apex strip as a strip of rubber used near or on the apex; ply-end gumstrip as a strip of rubber positioned at, or around, and in contact with the ends of the ply(s); ply/chipper gumstrip; chipper, on the exterior surfaces of the ply in the bead region; barrier, which physically separates and adheres the liner or innerliner to the ply; the flipper, which physically separates and adheres the ply to the bead assembly; belt edge underlay; inserts such as a center line insert and ply turn-up. The term gumstrip used in the description of some of the above components is a generic term for strips of rubber composition used in tire manufacturing. It is understood that a tire may have more than one of these rubber components or depending on the tire design (e.g. bias ply, radial, automotive, or heavy duty) may lack one or more of such components. Aircraft and heavy equipment tires, for example, generally have more reinforcing elements than automobile tires. Also the brominated polymer of this invention need be added to only one of these rubber components to promote a reduction in spider flow and, thus, create thereby an improved green tire or finished cured tire. Other rubber or rubber coated reinforcing elements exclusive of the tread cap, sidewall, and innerliner may also benefit.

The supporting carcass of the tire will generally contain one or more non-rubber reinforcing elements, such as fabric reinforcement. The supporting carcass will generally contain circumferential belt plies which are positioned beneath the tread portion. As explained above these plies usually have a rubber component as a coating or as part of a laminated structure. The reinforcing fabric used in the supporting carcass can be comprised of various suitable materials, such as glass, steel, polyester, nylon, aramid, and the like.

Generally at least one high modulus non-rubber reinforcement possibly with different orientation (e.g. bias ply) exists under the tread region of the tire. In a radical tire a fiber reinforcement extends from under the tread region down to and around both of the spaced beads. Fiber reinforcement can be in the form of individual fibers, bundles of fibers, and/or woven or non-woven cloth or may be laminated to a rubber component, coated with a rubber component or both.

The specific location of the rubber components in the carcass and their position with respect to other rubber or non-rubber components in the tire is important. The individual rubber components are formulated from rubbers, fillers, curatives, and other additives to have the requisite adhesion to other materials, modulus, tensile strength, and hysteresis. A rubber component that is designed to be in contact with and adhered to a non-rubber reinforcing component is usually compounded with appropriate adhesion promoters to effect adhesion of the rubber to the non-rubber components of the tire. Other nearby rubber components may lack adhesion promoters and thus would not adhere to the non-rubber components if they are inadvertently brought into contact with the non-rubber component due to deformation of a first rubber component or penetration of a non-rubber reinforcing component through an adhesive containing rubber component.

The brominated polymer has repeat units derived from polymerization of monomers comprising at least isobutylene and p-methylstyrene. The brominated polymer was found to be effective in providing reduced spider flow in rubber compositions used as rubber components in pneumatic tires. The spider flow properties can be useful in other uncured or curing rubber compositions including hoses, belts, etc. formed from assembly of at least one uncured rubber composition with one or more other rubber or non-rubber composition and subsequent curing under conditions including heat and pressure.

The bromine content of the brominated polymer is desirably from about 0.1 to about 4 percent by weight, and more desirably from about 0.1 to about 2.5 percent by weight based upon the weight of the brominated polymer. The isobutylene content is desirably from about 85 to about 99.4 or 98.9, alternatively about 88 to about 97.9, weight percent. The p-methylstyrene content is desirably from about 1 to about 14, alternatively about 2 to about 11 weight percent and more desirably from about 2 to about 10 or 12 weight percent. Repeat units from other monomers may be present in the polymer or may be excluded. Many such polymers are commercially available from Exxon as Exxpro™ and the preparation of such polymers are described in U.S. Pat. No. 5,162,445 hereby incorporated by reference. The Exxpro™ polymers originally commercialized have Mooney Viscosity ML (1+4) @ 100° C. of about 30 to about 50.

Curing (crosslinking) of brominated polymer such as described above can be accomplished with zinc oxide, blends of zinc oxide and organic fatty acid, zinc and sulfur containing accelerators, and some phenolic compounds. As explained later in the examples it was found to be desirable to add the zinc oxide and organic fatty acid late in the mixing of the rubber ply compositions to discourage crosslinking of the brominated polymers. The zinc oxide is desirably used in amounts from about 1 to about 14 and more desirably from about 2 to about 8 phr. Fatty acid is desirably used in amounts from about 0 to about 5 phr and more desirably from about 0 to about 2 or 3 phr based on 100 parts of conventional rubbers and the brominated polymer.

The other rubbers in the rubber component are conventional rubbers for components such as natural rubber, synthetic cis 1,4-polyisoprene rubber, polybutadiene rubber, isoprene-butadiene rubber, styrene-isoprene rubber, styrene-isoprene-butadiene terpolymer rubber or other elastomers derived from the polymerization of two or more dienes and a third or more other monomers, styrene-butadiene copolymer rubber and ethylene-propylene non-conjugated diene terpolymer rubber (EPDM). The amount of most components, additives, etc. in each rubber component or composition will hereafter be based upon 100 parts by weight total rubber as this is the conventional procedure used by rubber formulators. The 100 parts by weight rubber will comprise at least one conventional rubber, the brominated polymer(s), and any other optional rubber. Sometimes the synthetic rubbers with substantial amounts of diene based repeat units might be referred to as rubber with at least 33 weight percent and more desirably at least 50 weight percent repeat units from one or more conjugated dienes having from 4 to 8 carbon atoms. Examples of such diene rubbers include synthetic cis 1,4-polyisoprene rubber, cis 1,4-polybutadiene rubber, styrene-butadiene copolymer rubber, etc. Natural rubber (natural cis 1,4-polyisoprene rubber) is preferred for many applications such as, for example, tire components for tires to be used for farm and heavy equipment.

Conventional fillers, curatives, and additives are used in the rubber in conventional amounts for rubber components. Fillers include carbon blacks, silicas, etc, in amounts desirably from about 30 to about 150 phr depending on the properties required. Curatives are selected to result in adequate cure of the rubber components in the normal cure cycle for the other tire components. Common examples include sulfur, thiazoles, sulfenamides, carbamates, thiurams, xanthates, thioureas and guanidines. These curatives are in addition to the zinc oxide and organic fatty acid used to cure the brominated polymer(s). Other additives include extender oils, processing aids, adhesion promoters to promote adhesion to reinforcing components (such as fibers and/or wires including polyester, glass, steel, nylon, aramid, etc.), antioxidants, antiozonants, etc.

The rubber component compositions can be mixed in any conventional mixer such as a banbury mixer, two roll mill, etc. The rubber component can be shaped by any conventional practice such as extrusion, calendaring, pressing or combinations thereof. The rubber component may be laminated, filled, with or adhered to wires, fibers, cloth or other material during the forming operation. The rubber components may be cut, perforated, covered with a releasable layer or membrane, stored or otherwise handled between initial formation of the rubber component and final incorporation in the tire.

The green tire components can be assembled on a tire building machine using a suitable tire building drum. The different rubber components, plies, belts, beads, etc are delivered to the machine and the components placed on and secured to the other components of the green tire. The components of the green tire can be deformed (intentionally or accidentally) during tire building by inflatable bladders (such as turnup bladders) that assist in tire assembly and shaping. As specified earlier it is desirable that some rubber components of the tire (e.g. tread cap) easily deform while other components (including belt coats, ply coats, apexes, and wedges) retain their particular dimension and locations in the tire. Rubber component with adhesion promoters which are adjacent to wires, belts, cloths, cords, and fibers desirably maintain their location next to the wires, belts, cloths, cords, and fibers and do not allow the wires, belts, cloths, cords or fibers to penetrate through said rubber components into adjacent rubber components which may not have adhesives or may be blemished or rendered unusable by belt, cloth, cord or fiber entry therein. An example of an unusable ply is an innerliner that is punctured by a fiber, cloth or belt making it ineffective as an innerliner. The resistance to deformation during tire curing is spider flow. Controlled spider flow in individual tire components is important in tire manufacturing due to the criticality of component dimensions and location.

The assembled tire(s) can pass immediately to a tire curing machine or may be stored for later curing. Generally tires are cured in a tire mold comprising a rigid mold surface which determines the shape and molds the outer surfaces of the tread and sidewall and an inflatable bladder which fills the toroidal interior of the pneumatic tire pressing the tire into the rigid mold surface that forms the outer periphery of tire. The rigid mold surface may separate into multiple movable sections to facilitate removal of the cured tire from the mold. The inflatable bladder generally deflates to facilitate the removal of the cured tire. The resistance to spider flow of the specific rubber components is important during tire curing because the rubber components become softer and more deformable at elevated temperatures used for tire curing which may range from about 20° C. to about 175° C. and preferably from about 125° C. to about 175° C. For rubber components having critical dimensions, shapes, or locations it is desirable to have adequate resistance to spider flow so the rubber components are not unduly deformed by stresses imposed by the rigid molding surface for the tire periphery and/or the bladder.

Desirably the spider flow (as measured in the examples) of the rubber component or composition is decreased due to the inclusion of a brominated polymer by at least 10 percent, more desirably at least 20 percent and preferably at least 50 percent over a control where a portion of the conventional rubber is not replaced by a brominated polymer.

The rubber components of this disclosure are useful in preparing green (uncured) tires and finished tires. Tires having one or more rubber components comprising the brominated polymer are useful for their conventional purpose (e.g. passenger tires, truck tires, farm implement tires, heavy equipment tires, and aircraft tires, etc.). The process is useful to prepare tires with more controlled internal structure and structure dimensions.

EXAMPLES

The following examples show how natural rubber compositions (Tables I and II) synthetic cis-1,4-polyisoprene rubber compositions (Tables III, IV, IX and X) and compositions which are blends of styrene-butadiene rubber and cis 1,4-polybutadiene rubber (Tables V and VI) can be modified with a brominated copolymer of isobutylene and p-methylstyrene to result in reduced spider flow. The examples in Tables VII and VIII illustrate that butyl rubber, chlorobutyl rubber, and bromobutyl rubber do not reduce spider flow in cis 1,4-polyisoprene rubber based formulations.

The spider flow test is used by rubber tire manufacturers to evaluate the relative potential flowability of rubber compositions during the curing of a green tire. Test parameters used to generate these numbers are a 40 minute time period in a mold preheated to 135° C. or 55 minutes test period in a mold preheated to 165° C. using a ⅛ inch diameter orifice and hydraulic pressure of 20,000 lbs (9,080 kg). The temperature selected depends on the anticipated curing temperature of the component in the tire. The time depends on the anticipated curing time. Where location or dimensions of components in a tire are critical, low amounts of extrudate are desirable.

The mold used in the examples was equivalent to those manufactured by Brocton Machine Co., Inc. in Brocton, Mass., per DuPont Drawing Number EL-1156.

TABLE I

|  | Ctrl. A | Ex. 1 | Ex. 2 | Ex. 3 | Ex. 4 |
| --- | --- | --- | --- | --- | --- |
| Natural Rubber | 100 g | 95 | 90 | 85 | 90 |
| Exxpro ™ |  | 5 | 10 | 15 | 10 |
| HAF Carbon Black | 45 | 45 | 45 | 45 | 45 |
| Silica | 15 | 15 | 15 | 15 | 15 |
| Silica Coupling Agent | 2 | 2 | 2 | 2 | 2 |
| Antioxidants | 2.75 | 2.75 | 2.75 | 2.75 | 2.75 |
| Processing Aid | 1 | 1 | 1 | 1 | 1 |
| Zinc Oxide | 8 | 8 | 8 | 8 | 8 |
| Sulfur | 4 | 4 | 4 | 4 | 4 |
| Sulfenamide Accelerator | 0.75 | 0.75 | 0.75 | 0.75 | 0.75 |
| Fatty Acid | 1 | 1 | 1 | 1 | 3 |

The Exxpro™ EMDX 90-10 used in Table I is a brominated copolymer of isobutylene and para-methyl-styrene. It has about 2 weight percent bromine and about 7.5 weight percent paramethylstyrene, and has a Mooney viscosity ML (1+8) at 125° C. of about 45±5.

TABLE II

| Sample | Ex. 1A | Ex. 2A | Ex. 3A | Ctrl. A | Ex. 1B | Ex. 2B | Ex. 3B | Ex. 4B |
|---|---|---|---|---|---|---|---|---|
| Spider Flow 40 min./135° C. of Uncured Material | | | | | | | | |
| Volume cc | 4.30 | 2.95 | 2.02 | 7.51 | 6.20 | 5.22 | 3.21 | 9.14 |
| Sheet Cured at 135° C. | | | | | | | | |
| $t_{90}$ + (min) <---------- 140 minutes at 135° C. -----------> | | | | | | | | |
| Tensile Properties of Cured Material | | | | | | | | |
| Tensile (MPa) | 18.8 | 18.6 | 17.6 | 20.4 | 19.7 | 19.0 | 18.7 | 18.7 |
| Elong (%) | 350 | 338 | 307 | 389 | 383 | 366 | 343 | 350 |
| 200% Modulus (MPa) | 10.7 | 11.2 | 11.9 | 10.3 | 10.0 | 10.4 | 11.1 | 10.8 |

Rubber compositions for the Control A and Examples 1–4 (later 1A–3A and 1B–4B) were formulated with the recipes of Table I. A conventional three stage mixing sequence was used wherein the rubbers and a substantial portion of the fillers are mixed in a first (nonproductive) mixing cycle of a mixer such as a Banbury™ internal rubber mixer. The mixture was discharged to a mill where it was sheeted out and cooled before the mixture temperature reached 171–176° C. In a second (nonproductive) mixing cycle the rest of the fillers and most of the additives (except the curatives) were added and homogenized into the rubber. Again the mixture was removed from the mixer before the temperature of the mixture reached 171–176° C. In the third (productive) mix cycle the sulfur and accelerator were added and homogenized. The discharge temperature of the mixture was limited to below 115–125° C. in this productive mix cycle due to the presence of the sulfenamide accelerator.

In Table II the uncured and cured characteristics of the examples 1A–3A, 1B–4B, and the controls are shown. In examples 1B–3B 1 phr (in 4B it was 3 phr) of the fatty acid and 5 phr of the total zinc oxide were added in the first (nonproductive) mix cycle to promote coupling of the brominated polymers at the higher mixing temperatures. In examples 1A–3A all of the fatty acid and zinc oxide were added in the third (productive) mix cycle. The Rheometer results indicated the cure characteristics did not change much due to the differences in the amount of brominated polymers in the examples. The spider flow test demonstrates a decrease in the spider flow (a decrease in the volume of extrudate) as the amount of brominated polymer increased from 0 phr in the control through intermediate amounts of brominated polymer in examples 1A, 2A, 1B, and 2B and finally to 15 phr in examples 3A and 3B. In examples 1B–3B the addition of 1 phr of organic fatty acid and 5 phr of zinc oxide occurred in the first (nonproductive) mix cycle and this addition sequence did not decrease the spider flow as much as the addition of all of the fatty acid and the zinc oxide in the third (productive) mix cycle (examples 1A–3A).

The samples were also evaluated after curing for 140 minutes at 135° C. in Table II. The brominated polymers increased the modulus over the control and lowered the percent elongation at break slightly. The samples with the brominated polymers were slightly harder at room temperature and at 100° C. The addition of brominated Exxpro™ EMDX 90-10 did not increase elevated temperature hysteretic properties.

TABLE III

| Sample | Ctrl. B | Ex. 5 |
|---|---|---|
| Natsyn ® 2200x | 100 | 90 |
| EMDX90-10* | 0 | 10.00 |
| N299 | 35.00 | 35.00 |
| Flectol ™ H | 2.00 | 2.00 |
| Flexon ™ 641 | 5.00 | 5.00 |
| Second (Nonproductive) Mix Cycle | | |
| HiSil ™ 210 | 15.00 | 15.00 |
| X-50-S | 3.00 | 3.00 |
| Third (Productive) Mix Cycle | | |
| ZnO | 5.00 | 5.00 |
| Stearic Acid | 2.00 | 2.00 |
| TBBS | 1.00 | 1.00 |
| Sulfur | 1.40 | 1.40 |

*Natsyn ® N2200 is a synthetic cis 1,4-polyisoprene with ML 1 + 4 at 100° C. of 75 ± 8 available from The Goodyear Tire & Rubber Company.
HiSil ™ 210 is a precipitated silicate available from PPG Industries, Pittsburgh.
X-50-S is 50/50 weight ratio of N333 carbon black and bis-(3-triethyoxysilylpropyl) tetrasulfide available from Degussa.
*N299 is an ISAF carbon black.
*EMDX is as previously described after Table II.
*Flectol ™ H is 2,2,4-trimethyl-1,2-dihydroquinoline.
*Flectol ™ 641 is a processing oil.
*TBBS is N-tert-butyl-1-benzothiazole sulfenamide

TABLE IV

| Sample | Ctrl. B | Ex. 5 |
|---|---|---|
| Spider Flow 55 min/165° C. of Uncured Material | | |
| Weight (g) | 15.7 | 13.7 |
| Rheometer Results 100 cpm 150° C. Uncured Material | | |
| Max Torque. | 34.0 | 36.6 |
| Min Torque. | 8.5 | 10.4 |
| Delta Torque. | 25.5 | 26.2 |
| $t_{90}$ (min) | 16.2 | 19.2 |
| $t_{25}$ (min) | 10.7 | 11.4 |
| $T_2$ (min) | 9.3 | 9.6 |
| Sheet Cured 36 Minutes at 150° C. | | |
| Properties of Cured Material | | |
| Tensile (MPa) | 23.7 | 22.5 |
| Elong at break (%) | 631 | 607 |
| 100% modulus (MPa) | 1.8 | 2.1 |
| 200% modulus (MPa) | 4.7 | 5.2 |
| 300% modulus (MPa) | 9.0 | 9.6 |
| Shore A 24 ± 2° C. | 58.1 | 61.0 |
| Shore A 100° C. | 50 | 55.5 |

Tables III and IV illustrate that a reduction in spider flow associated with adding brominated copolymers of isobutylene and p-methylstyrene to a synthetic cis 1,4-polyisoprene based formulation. The data in Tables III and IV were generated from a mix cycle sequence where the stearic acid and zinc oxide were added in the preferred third (productive) mixing stage rather than a less preferred earlier mix cycle.

TABLE V

| Sample | Ctrl C | Ex 6 | Ex 7 | Ex 8 | Ctrl D |
|---|---|---|---|---|---|
| Plioflex ® 1502 | 49.00 | 47.50 | 45.00 | 40.00 | 50.00 |
| Budene ® 1207 | 49.00 | 47.50 | 45.00 | 40.00 | 50.00 |
| EMDX 90-10 | 2.00 | 5.00 | 10.00 | 20.00 | 0 |
| N299 | 50.0 | 50.0 | 50.0 | 50.0 | 50.0 |
| Flectol ™ H | 2.0 | 2.0 | 2.0 | 2.0 | 2.0 |
| Flexon ™ 641 | 5.0 | 5.0 | 5.0 | 5.0 | 5.0 |
| Second (Nonproductive) Mix Cycle | | | | | |
| Third (Productive) Mix Cycle | | | | | |
| ZnO | 5.00 | 5.00 | 5.00 | 5.00 | 5.00 |
| Stearic Acid | 2.00 | 2.00 | 2.00 | 2.00 | 2.00 |
| TBBS | 1.00 | 1.00 | 1.00 | 1.00 | 1.00 |
| Sulfur | 1.40 | 1.40 | 1.40 | 1.40 | 1.40 |

*Plioflex ® 1502 is a copolymer of 23.5 wt. % styrene and 76.5 wt. % butadiene with ML 1 + 4 at 100° C. of 50 ± 5 prepared by emulsion polymerization available from The Goodyear Tire & Rubber Company.
*Budene ® 1207 is a solution polybutadiene with ML 1 + 4 at 100° C. of 55 ± 5 available from The Goodyear Tire & Rubber Company.

TABLE VI

| Sample | Ctrl. C | Ex. 6 | Ex. 7 | Ex. 8 | Ctrl. D |
|---|---|---|---|---|---|
| Spider Flow 55 min/165° C. | | | | | |
| Weight | 14.2 g | 12.3 | 11.1 | 7.79 | 13.7 |
| Rheometer Results 100 cpm 150° C. Uncured Material | | | | | |
| Max Torque. | 43.8 | 44.1 | 46.0 | 51.9 | 42.8 |
| Min Torque. | 9.2 | 10.8 | 13.0 | 18.2 | 8.8 |
| Delta Torque. | 34.6 | 33.3 | 33.0 | 33.7 | 34.0 |
| $t_{90}$ (min) | 15.7 | 16.0 | 16.3 | 15.6 | 16.1 |
| $t_{25}$ (min) | 10.5 | 10.7 | 10.7 | 9.1 | 10.5 |
| $T_2$ (min) | 8.2 | 8.4 | 8.3 | 6.9 | 8.4 |
| Sheet Cured 36 Minutes at 150° C. | | | | | |
| Tensile (MPa) | 18.9 | 18.9 | 18.4 | 16.4 | 19.0 |
| Elong (%) | 483 | 479 | 450 | 370 | 510 |
| 100% mod. (MPa) | 2.3 | 2.3 | 2.5 | 2.9 | 2.2 |
| 200% mod. (MPa) | 5.5 | 5.8 | 6.2 | 7.6 | 5.3 |
| 300% mod. (MPa) | 10.8 | 11.1 | 11.8 | 14.0 | 10.2 |
| Shore A 24 ± 2° C. | 65.0 | 66.2 | 66.9 | 68.6 | 65.4 |
| Shore A 100° C. | 58.6 | 59.5 | 59.7 | 60.8 | 59.1 |

Tables V and VI illustrate the effect of substituting different amounts of the brominated copolymers of isobutylene and p-methylstyrene (EMDX90-10) for the base butadiene rubber. Control D has no. brominated copolymer while Control C has 2 phr. Examples 6, 7, and 8 have 5, 10, and 20 phr respectively of the brominated copolymer of isobutylene and p-methylstyrene. While the brominated copolymer present at 2 phr in Control C resulted in higher amounts of spider flow, the brominated copolymer in Examples 6, 7, and 8 decreased the spider flow with the larger decreases being associated with larger amounts of the brominated copolymer. Table VI also illustrates the decrease in spider flow when the base rubber is a blend of two synthetic butadiene based polymers.

TABLE VII

| Sample | Ctrl. E | Ctrl. F | Ctrl. G | Ctrl. H |
|---|---|---|---|---|
| Natsyn ® 2200 | 90. | 100. | 90. | 90. |
| Butyl* | 10. | 0 | | |
| Chlorobutyl** | | | 10. | |
| Bromobutyl*** | | | | 10. |
| N299 | 50. | 50. | 50. | 50. |
| Flectol ™ H | 2.00 | 2.00 | 2.00 | 2.00 |
| Flexon ™ 641 | 5.00 | 5.00 | 5.00 | 5.00 |
| Second (Nonproductive) Mix Cycle | | | | |
| ZnO | 5.00 | 5.00 | 5.00 | 5.00 |
| Stearic Acid | 2.00 | 2.00 | 2.00 | 2.00 |
| Third (Productive) Mix Cycle | | | | |
| TBBS | 1.00 | 1.00 | 1.00 | 1.00 |
| Sulfur | 1.40 | 1.40 | 1.40 | 1.40 |

*Butyl is a commercial butyl rubber being predominantly repeat units from isobutylene with a small percentage of repeat units from dienes imparting residual unsaturation for crosslinking purposes.
**Chlorobutyl is a butyl rubber as above that has been chlorinated.
***Bromobutyl is a butyl rubber as above that has been brominated.
The trade names of the above polymers are Butyl 365, Chlorobutyl HT-10-66, and Bromobutyl 2222. They are available from Exxon.

TABLE VIII

| Sample | Ctrl. E | Ctrl. F | Ctrl. G | Ctrl. H |
|---|---|---|---|---|
| Spider Flow 40 min/135° C. on Uncured Material | | | | |
| Weight | 14.4 g | 13.8 | 14.4 | 14.3 |
| Rheometer Results 100 cpm 150° C. Uncured Material | | | | |
| Max Torque | 33.8 | 34.8 | 35.9 | 35.8 |
| Min Torque | 8.1 | 8.7 | 7.8 | 7.9 |
| Delta Torque | 25.7 | 26.1 | 28.1 | 27.9 |
| $t_{90}$ (min) | 13.9 | 13.7 | 15.4 | 15.5 |
| $t_{25}$ (min) | 10.1 | 10.0 | 10.6 | 10.5 |
| $T_2$ (min) | 9.0 | 9.0 | 9.4 | 9.4 |
| Sheet Cured 36 Minutes at 150° C. | | | | |
| Properties of Cured Material | | | | |
| Tensile (MPa) | 21.7 | 24.3 | 22.3 | 21.6 |
| Elong (%) | 542 | 578 | 527 | 530 |
| 100% mod. (MPa) | 2.1 | 2.0 | 2.3 | 2.3 |
| 200% mod. (MPa) | 5.8 | 5.6 | 6.2 | 6.2 |
| 300% mod. (MPa) | 11.0 | 11.0 | 11.9 | 11.6 |
| Shore A 24 ± 2° C. | 61.9 | 61.0 | 63.5 | 63.9 |
| Shore A 100° C. | 55.9 | 56.4 | 57.7 | 57.8 |

Tables VII and VIII illustrate that utilization of other copolymers of isobutylene (e.g. butyl rubber, bromobutyl rubber, and chlorobutyl rubber) were observed to not change the spider flow of a synthetic cis 1,4-polyisoprene rubber composition.

TABLE IX

| Sample | Ctrl. I | Ctrl. J | Ex. 9 |
|---|---|---|---|
| Natsyn ® 2200 | 98. | 100. | 90. |
| EMDX90-10 | 2.00 | 0 | 10.00 |
| N299 | 50. | 50. | 50. |
| Flectol ™ H | 2.00 | 2.00 | 2.00 |
| Flexon ™ 641 | 5.00 | 5.00 | 5.00 |

TABLE IX-continued

| Sample | Ctrl. I | Ctrl. J | Ex. 9 |
|---|---|---|---|
| Second (Nonproductive) Mix Cycle (Remill) Third (Productive) Mix Cycle | | | |
| ZnO | 5.00 | 5.00 | 5.00 |
| Stearic Acid | 2.00 | 2.00 | 2.00 |
| TBBS | 1.00 | 1.00 | 1.00 |
| Sulfur | 1.40 | 1.40 | 1.40 |

TABLE X

| Sample | Ctrl. I | Ctrl. J | Ex. 9 |
|---|---|---|---|
| Spider Flow 55 min/165° C. on Uncured Material | | | |
| Weight (g) | 14.7 | 14.3 | 12.4 |
| Rheometer Results 100 cpm 150° C. Uncured Material | | | |
| Max Torque | 39.0 | 38.9 | 42.7 |
| Min Torque | 7.7 | 7.4 | 11.1 |
| Delta Torque | 31.3 | 31.5 | 31.6 |
| $t_{90}$ (min) | 13.4 | 12.8 | 15.0 |
| $t_{25}$ (min) | 9.2 | 8.8 | 9.7 |
| $T_2$ (min) | 7.9 | 7.6 | 8.1 |
| Sheet Cured 36 Minutes at 150° C. Properties of Cured Material | | | |
| Tensile (MPa) | 24.2 | 24.6 | 22.5 |
| Elong (%) | 549 | 558 | 496 |
| 100% mod. (MPa) | 2.3 | 2.2 | 2.6 |
| 200% mod. (MPa) | 6.2 | 6.1 | 7.0 |
| 300% mod. (MPa) | 11.9 | 11.9 | 13.1 |
| Shore A 24 ± 2° C. | 63.2 | 62.9 | 64.5 |
| Shore A 100° C. | 57.7 | 57.5 | 59.3 |

Tables IX and X confirm the results of Tables III and IV that EMDX90-10 is observed to reduce the spider flow when present at concentrations above 2 parts by weight per 100 parts by weight of total rubber.

While in accordance with the patent statutes the best mode and preferred embodiment has been set forth, the scope of the invention is not limited thereto, but rather by the scope of the attached claims.

What is claimed is:

1. A method for controlling the flow of selected gum rubber components while preparing a pneumatic tire comprising:

building an unvulcanized tire which is comprised of a circumferential rubber tread cap, two spaced reinforcing beads, two rubber sidewalls each contacting a different said bead, and which includes at least one gumstrip selected from the group consisting of a gum chafer, or an apex, or an apex strip, or a flipper, or a chipper, or a ply chipper gumstrip, or a ply-end gumstrip, or a belt edge wedge, or a shoulder wedge, forming said gumstrip by adding and mixing based upon 100 total parts by weight of rubber of from about 85 to about 97 parts by weight of a natural rubber, or at least one synthetic-diene-based elastomer, or combinations thereof, with from about 3 to about 15 parts by weight of a brominated polymer of about 0.1 % to about 4% by weight bromine having repeat units derived from polymerizing at least about 85 to about 98.9% by weight of isobutylene monomer and from about 1 to about 14% by weight of p-methylstyrene monomer, and subsequently adding to said blended polymers and mixing from about 5 to about 14 parts by weight phr of zinc oxide and from about 0 to about 2 parts by weight phr of a fatty acid, wherein utilizing said brominated polymer, said zinc oxide, and said fatty acid results in at least 10% less spider flow of said gum strip at 135° C. for 40 minutes than for said gum strip formulated without said brominated polymer, and vulcanizing said tire.

* * * * *